(12) United States Patent
Pang et al.

(10) Patent No.: US 11,954,917 B2
(45) Date of Patent: Apr. 9, 2024

(54) METHOD OF SEGMENTING ABNORMAL ROBUST FOR COMPLEX AUTONOMOUS DRIVING SCENES AND SYSTEM THEREOF

(71) Applicant: Shandong Kailin Environmental Protection Equipment Co., Ltd., Shandong (CN)

(72) Inventors: Shouen Pang, Shandong (CN); Jichong Yang, Shandong (CN); Xiaoming Xi, Shandong (CN); Yang Ning, Shandong (CN); Longsheng Xu, Shandong (CN); Shixi Pang, Shandong (CN); Zhenxing Sun, Shandong (CN)

(73) Assignee: Shandong Kailin Environmental Protection Equipment Co., Ltd., Shandong (CN)

( * ) Notice: Subject to any disclaimer, the term of this patent is extended or adjusted under 35 U.S.C. 154(b) by 0 days.

(21) Appl. No.: 18/350,768

(22) Filed: Jul. 12, 2023

(65) Prior Publication Data

US 2024/0071096 A1   Feb. 29, 2024

(30) Foreign Application Priority Data

Aug. 25, 2022   (CN) .......................... 202211022946.9

(51) Int. Cl.
*G06V 20/58* (2022.01)
*B60W 60/00* (2020.01)

(52) U.S. Cl.
CPC ........... *G06V 20/58* (2022.01); *B60W 60/001* (2020.02); *B60W 2420/403* (2013.01); *B60W 2554/4049* (2020.02)

(58) Field of Classification Search
CPC ................ G06V 20/58; B60W 60/001; B60W 2420/42; B60W 2554/4049
See application file for complete search history.

(56) References Cited

U.S. PATENT DOCUMENTS

| 10,373,317 B1 | 8/2019 | Kim et al. |
| 2016/0129907 A1* | 5/2016 | Kim ....................... G08G 1/167 701/26 |

(Continued)

FOREIGN PATENT DOCUMENTS

| CN | 109190707 | 1/2019 |
| CN | 110111335 | 8/2019 |

(Continued)

*Primary Examiner* — Santiago Garcia
(74) *Attorney, Agent, or Firm* — JCIPRNET

(57) ABSTRACT

A present disclosure is a method of segmenting an abnormal robust for complex autonomous driving scenes and a system thereof, specifically relates to the technical field of an image segmenting system. The system includes: a segmentation module, configured to transmit an obtained input image to the segmentation network to obtain a segmentation prediction image, and then quantify the uncertainty of a segmentation prediction by means of calculating two different discrete metrics; a synthesis module, configured to match a generated data distribution with a data distribution of the input image by utilizing a conditional generative adversarial network; a difference module, configured to model and calculate the input image, an generated image, the semantic feature map and the uncertainty feature map based on an encoder, a fusion module and a decoder, to generate the segmentation prediction images for the abnormal objects; a model training module; and an integrated prediction module.

6 Claims, 2 Drawing Sheets

(56) References Cited

U.S. PATENT DOCUMENTS

| | | | |
|---|---|---|---|
| 2020/0088883 A1* | 3/2020 | Lu | G01S 17/10 |
| 2020/0089968 A1* | 3/2020 | Lu | G01S 17/89 |
| 2021/0188308 A1* | 6/2021 | Zhu | G01C 21/3407 |
| 2021/0188310 A1* | 6/2021 | Guo | G08G 1/166 |
| 2021/0303925 A1 | 9/2021 | Hofmann et al. | |
| 2022/0153297 A1* | 5/2022 | Chen | G01S 13/865 |
| 2022/0212657 A1* | 7/2022 | Sugano | B62D 15/0285 |
| 2023/0386167 A1* | 11/2023 | Fuelster | G06V 10/776 |

FOREIGN PATENT DOCUMENTS

| | | |
|---|---|---|
| CN | 110837836 | 2/2020 |
| CN | 111199550 | 5/2020 |
| CN | 111639524 | 9/2020 |
| CN | 111652129 | 9/2020 |
| CN | 112381101 | 2/2021 |
| CN | 112508977 | 3/2021 |
| CN | 112883820 | 6/2021 |
| CN | 113537462 | 10/2021 |
| CN | 113780292 | 12/2021 |
| CN | 113887306 | 1/2022 |
| CN | 114299286 | 4/2022 |
| CN | 114372506 | 4/2022 |
| CN | 114399640 | 4/2022 |
| CN | 114419058 | 4/2022 |
| CN | 114549842 | 5/2022 |
| CN | 114677507 | 6/2022 |
| CN | 114742799 | 7/2022 |
| CN | 114926819 | 8/2022 |
| WO | 2022079201 | 4/2022 |

\* cited by examiner

METHOD OF SEGMENTING ABNORMAL ROBUST FOR COMPLEX AUTONOMOUS DRIVING SCENES AND SYSTEM THEREOF

CROSS-REFERENCE TO RELATED APPLICATION

This application claims the priority benefit of China application serial no. 202211022946.9 filed on Aug. 25, 2022. The entirety of the above-mentioned patent application is hereby incorporated by reference herein and made a part of this specification.

BACKGROUND

Technical Field

The present disclosure relates to a field of image segmenting system, specifically to a method of segmenting an abnormal robust for complex autonomous driving scenes and a system thereof.

Description of Related Art

The descriptions in this part merely provide background technology related to the present disclosure and do not necessarily constitute the prior art.

From the latest progress in deep learning methods, the computer vision technology has made a significant progress. Different from previous traditional methods, methods based on convolutional neural networks have a relatively high prediction accuracy, therefore, these methods have become the standard methods for image classification, image segmentation and object detection. However, although the above methods are capable of having a high prediction accuracy for independent identically distribution scenes, the prediction accuracy of the targets for non-distributed abnormal scenes is extremely low or even fails.

Due to the shift in data distribution, some traditional state-of-the-art semantic segmentation models commonly cannot accurately segment abnormal objects, therefore, the limitation limits the deployment of such methods in some critical and complex real-world scenes, such as autonomous driving. When the segmentation model is not capable of correctly segmenting the abnormal objects appearing in the middle of the road and identifying them as part of the road, the above wrong prediction results are highly likely to lead to traffic accidents. Specifically, firstly, the uncertainty estimation of pixels is capable of detecting abnormal objects to a certain extent. However, due to the existence of some noise in such methods, abnormal objects are commonly regarded as a training class or mixed with the same background class, resulting in reduced segmentation accuracy. Secondly, although the abnormal objects can be found to a certain extent by recombining the input images from the predicted images and comparing them, it is extremely complicated to find the abnormal objects between the predicted images and the input images because this method is not capable of accurately reconstructing the noise blocks (the abnormal objects may be reconstructed by mistake as a combination of a plurality of training classes).

After the above analysis, although the method for uncertainty estimation based on pixels and the method of re-constructing the predicted images are capable of achieving the segmentation of abnormal objects to a certain extent, other prediction errors are inevitably be introduced. Therefore, how to explore the complementary information between the prediction results of these two types of methods and fuse them effectively become more and more important, so as to further improve the detection accuracy of abnormal objects in the non-distributed real autonomous driving scenes.

SUMMARY

In order to effectively fuse the uncertainty estimation of pixels and the re-synthesis method for the predicted images, the present disclosure provides a method of segmenting an abnormal robust for complex autonomous driving scenes and a system thereof. By comprehensively considering the advantages of the uncertainty estimation method and the synthesis method based on the prediction image, the present disclosure realizes the robust prediction and estimation on different abnormal scenes in the real urban automatic driving scenes.

In order to realize the above objective, the present disclosure provides the following technical solutions, that is, a system of segmenting an abnormal robust for complex autonomous driving scenes. The system comprises as follows.

A segmentation module is configured to transmit an obtained input image to the segmentation network to obtain a segmentation prediction image, and then quantify the uncertainty of a segmentation prediction by means of calculating two different discrete metrics.

A synthesis module is configured to match a generated data distribution with a data distribution of the input image by utilizing a conditional generative adversarial network.

A difference module is configured to model and calculate the input image, an generated image, the semantic feature map and the uncertainty feature map based on an encoder, a fusion module and a decoder, to generate the segmentation prediction images for abnormal objects.

A model training module is configured to perform iterative trainings continuously based on a constructed loss function until training rounds or training accuracy reaches a set threshold, and save a network model with a minimum loss value; considering that the abnormal objects do not belong to a class in a training set, the model training module is capable of performing a robust detection on the abnormal objects in complex real-world scenes on a premise of ensuring that the model does not overfit specific objects in non-distributed data during a training process.

An integrated prediction module is configured to take an obtained uncertainty prediction as a focus of the difference module, and predict the input image data by utilizing a trained network model to obtain the segmentation prediction results of the abnormal objects.

The present disclosure also provides a method of segmenting an abnormal robust for complex autonomous driving scenes. The method comprises the following steps.

In S1, a segmentation module.

Firstly, an input image is taken as an input of a segmentation network to obtain a semantic feature map of a middle layer.

Secondly, an uncertainty of the semantic feature map is quantified based on two discrete metrics of an entropy $E_x$ for softmax and a distance $D_y$ for softmax.

In S2, a synthesis module.

By introducing a perceptual loss between an original input image and a synthesized image, high-level semantic information on the images are directly compared through a model, rather than merely utilizing low-level visual features such as colors and textures.

In S3, a difference module.

The original input image is distinguished from the synthesized image through a training network, and a generated feature map is associated with an uncertainty feature map pixel by pixel; the feature maps are decoded through the decoder, high-level skip connections are performed on the feature maps respectively based on a FPN to eventually obtain segmentation prediction results of abnormal objects in complex scenes.

In S4, a model training module.

Objects that do not belong to a training class are overwritten by marking a void class in a Ground Truth image as an abnormal class.

In S5, an integrated prediction module.

Prediction results from different inputs are integrated by using weighted average values, and a size of an optimal weight is automatically selected by a grid searching.

Preferably, in S1, a false segmentation prediction is understood by using a difference value between two distances, and the two distances are defined respectively as follows:

$$E_x = -\sum_c p(c)\log_2 p(c),$$

$$D_y = \left(\frac{1}{2} - \max_c p(c)\right) + \left(\frac{1}{2} + \max_c p(c)\right),$$

where p(c) represents a softmax a probability of a c class.

Preferably, in S2, a perceptual loss between a pixel x of the input image and a pixel r of the synthesized image is defined as follows:

$$p_{pcep} = \sum_{i=1}^{N} \frac{1}{K_i} \|S^i(x) - S^i(r)\|_2^2,$$

where $S^i$ represents the i-th layer which includes $K_t$ elements and N training layers.

Preferably, in S4, firstly, predicted semantics in regions to be predicted are closely related to the different abnormal scenes; secondly, the regions to be predicted are also closely related to uncertain pixels with high confidence, thereby guiding the network to perform an abnormal prediction based on uncertain information of pixels at the same time.

In the above technical solutions, the technical effects and advantages provided by the present disclosure are as follows.

The method of segmenting the abnormal robust for the complex autonomous driving scenes and the system thereof are provided in the present disclosure, which has excellent performance in the segmentation of abnormal objects in the real automatic driving scenes in comparison with the previous methods.

Firstly, the present disclosure provides a new pixel-level abnormal objects detection framework, which can fuse the advantages of uncertainty estimation and re-synthesis methods; secondly, the present disclosure effectively improves the robustness of abnormal objects detection under different automatic driving scenes, while maintaining the most advanced segmentation accuracy; eventually, the uncertainty estimation method based on pixels and the reconstruction method of the predicted image are capable of implementing the deep learning requirements for the abnormal object segmentation task in most automatic driving scenes. This idea also can be extended to different objects segmentation and re-synthesis networks to help complete the deep learning tasks better in other fields.

BRIEF DESCRIPTION OF THE DRAWINGS

In order to illustrate the technical solutions in the embodiments of the present disclosure or in the prior art more clearly, a brief description of the drawings used in the embodiments is provided below. It is obvious that the drawings described below are merely some of the embodiments recorded in the present disclosure, and other drawings may also be obtained according to these drawings for those who skilled in the art.

DESCRIPTION OF THE EMBODIMENTS

In order to enable those skilled in the art to better understand the technical solutions of the present disclosure, the present disclosure is further explained in combination of the drawings and embodiments.

Figure 1:
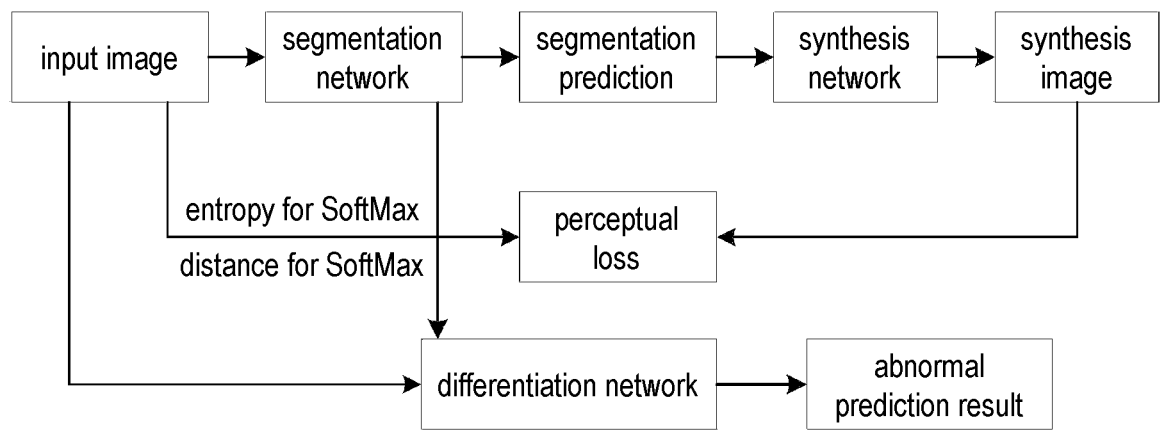
FIG. 1 illustrates a schematic flow of a network learning of an abnormal segmentation for complex autonomous driving scenes provided the present disclosure.
Figure 2:
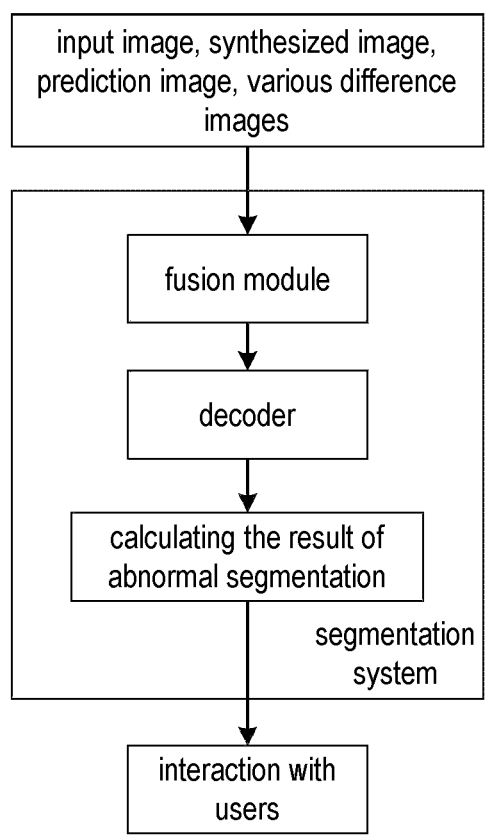
FIG. 2 illustrates a schematic diagram of a model framework of an abnormal robust segmentation system provided by the present disclosure.

As illustrated in FIG. 1 and FIG. 2, the present disclosure provides a method of segmenting an abnormal robust for complex autonomous driving scenes and a system thereof. The method comprises the following steps.

In S1, the segmentation module.

Firstly, an input image is taken as an input of a segmentation network to obtain a semantic feature map of a middle layer.

Secondly, the uncertainty of the semantic feature map is quantified based on two discrete metrics of the entropy $E_x$ for softmax and the distance $D_y$ for softmax. It is worth noting that the false segmentation prediction is understood by using a difference value between the above two distances, and the two distances are defined respectively as follows:

$$E_x = -\sum_c p(c)\log_2 p(c),$$

$$D_y = \left(\frac{1}{2} - \max_c p(c)\right) + \left(\frac{1}{2} + \max_c p(c)\right),$$

where p(c) represents a softmax probability of c class.

In S2, the synthesis module.

When the conditional generative adversarial network reaches Nash equilibrium, although the re-synthesis module can generate images, and generate realistic objects and pedestrians in complex automatic driving scenes to a certain extent, the generated images will inevitably ignore low-level visual information such as colors or appearances, so that the model can easily compare image information pixel by pixel. Therefore, through introducing a perceptual loss between an original input image and a synthesized image by the present disclosure, the high-level semantic information of the images are directly compared by a model, rather than merely using the low-level visual features such as colors and textures. Specifically, the perceptual loss between the pixel x of the input image and the pixel r of the synthesized image is defined as follows:

$$p_{pcep} = \sum_{i=1}^{N} \frac{1}{K_i} \|S^i(x) - S^i(r)\|_2^2,$$

where $S^i$ represents the i-th layer, which includes K, elements and training layers.

In S3, the difference module.

Firstly, for the encoder, each image is extracted by the encoder. The original input image and the re-synthesized image are processed by the pre-trained ResNet32, and the semantic feature map is processed by a simple convolutional neural network. In addition, the uncertainty of the input image is estimated by introducing a new multi-task path. Secondly, for the fusion module, the input image, synthetic image and semantic feature map are fused by using the feature pyramid FPN of the image, and the information flow between them is transmitted by 3×3 convolution. In this step, the original input image is distinguished from the synthesized image through a training network, and a generated feature map is associated with an uncertainty feature map pixel by pixel in the present disclosure. Eventually, the feature maps are decoded through the decoder, high-level skip connections are performed on the feature maps respectively based on a FPN to and eventually obtain segmentation prediction results of abnormal objects in complex scenes.

In S4, the model training module.

The conditional generative adversarial network is trained by adding new source training data in the present disclosure. Specifically, objects that do not belong to any training class are overwritten by marking the void class in the Ground Truth image as an abnormal class. Firstly, predicted semantics in regions to be predicted are closely related to the different abnormal scenes (the abnormal objects are recognized as a known training type, the abnormal objects are recognized as a mixture of several types, and the abnormal objects are recognized as a background class), rather than merely focusing on one of the different abnormal scenes; secondly, the regions to be predicted are also closely related to uncertain pixels with high confidence, thereby guiding the network to perform an abnormal prediction based on uncertain information of pixels at the same time.

In S5, the integrated prediction module.

Prediction results from different inputs are integrated by using weighted average values, and the size of the optimal weight is automatically selected by a grid searching.

As illustrated in FIG. 2, the whole model framework of the abnormal segmentation system is explained.

The corresponding direct input in FIG. 2 is the original image, and other images in the input (synthesized image, prediction image and various difference images) are capable of generating automatically based on the original image, without the necessary for manual input separately.

Specifically, the original image is input into the abnormal objects segmentation system by the user, then feature vector extraction, feature coding, feature fusion and feature decoding are performed automatically in the segmentation system, and then the abnormal segmentation prediction result is output to interact with the user.

By comprehensively considering the advantages of the uncertainty estimation method and the synthesis method based on the prediction image, the robust prediction and estimation of different abnormal scenes in the real urban automatic driving scene (the abnormal objects are recognized as a known training type, the abnormal objects are recognized as a mixture of many types, and the abnormal objects are recognized as a background class) are realized in the present disclosure.

Considering that the traditional re-synthesis methods based on prediction image mainly converts the problem of recognizing abnormal objects into the problem of recognizing the difference between the input image and the synthesized image, the above traditional methods are improved by integrating different uncertainty measurement methods in the present disclosure, and the differentiation between the input image and the reconstructed image are effectively improved.

The framework of the present disclosure has the following advantages. Firstly, the framework provided by the present disclosure is capable of better adapting to non distributed scenes. Obviously, such advantages can enable the framework provided by the present invention to be better deployed in complex real-world scenes; secondly, the framework provided by the present disclosure is capable of effectively improving the generalization ability of the segmentation network in non distributed scenes without reducing the accuracy of the segmentation network. Obviously, these advantages allow the framework to significantly reduce the complexity of adding abnormity detectors to a segmentation network by introducing less additional computational efforts, which is commonly a common or unavoidable disadvantage of other abnormity detection tasks.

The above merely describes some exemplary embodiments of the present disclosure by way of explanation, and there is no doubt that the described embodiments may be modified in a variety of different ways for those who skilled in the art, without deviating from the spirit and scope of the present disclosure. Therefore, the above drawings and descriptions are illustrative in nature and should not be construed as limiting the protection scope of the claims of the present disclosure.

What is claimed is:

1. A method of segmenting an abnormal robust for complex autonomous driving scenes, comprising following steps:
S1, a segmentation module
firstly, taking an input image as an input of a segmentation network to obtain a semantic feature map of a middle layer;
secondly, quantifying, based on two discrete metrics of an entropy $E_x$ for softmax and a distance $D_y$ for softmax, an uncertainty of the semantic feature map;
S2, a synthesis module
directly comparing, through a model, high-level semantic information on images by introducing a perceptual loss between an original input image and a synthesized image, rather than merely utilizing low-level visual features such as colors and textures;
S3, a difference module
distinguishing, through a training network, the original input image from the synthesized image, and associating a generated feature map with an uncertainty feature map pixel by pixel; eventually; decoding, through a decoder, feature maps, and performing, based on a FPN, high-level skip connections on the feature maps respectively to eventually obtain segmentation prediction results of abnormal objects in complex scenes;

S4, a model training module
overwriting, by marking a void class in a Ground Truth image as an abnormal class, objects that do not belong to a training class,
wherein the model training module performs iterative trainings continuously based on a constructed loss function until training rounds or training accuracy reaches a set threshold, and save a network model with a minimum loss value; wherein considering that the abnormal objects do not belong to a class in a training set, the model training module is capable of performing a robust detection on the abnormal objects in complex real-world scenes on a premise of ensuring that the model does not overfit specific objects in non distributed data during a training process; and
S5, an integrated prediction module
integrating, by using weighted average values, prediction results from different inputs, wherein a size of an optimal weight is automatically selected by a grid searching, wherein the segmentation module, the synthesis module, the difference module, the model training module, and the integrated prediction module are executed by a hardware processor;
wherein in S1, a difference value between two distances is used to understand a false segmentation prediction, and the two distances are defined respectively as follows:

$$E_x = -\sum_c p(c) \log_2 p(c),$$

$$D_y = \left(\frac{1}{2} - \max_c p(c)\right) + \left(\frac{1}{2} + \max_c p(c)\right),$$

where p(c) represents a softmax probability of a c class.

2. The method of segmenting the abnormal robust for the complex autonomous driving scenes according to claim 1, wherein in S2, the perceptual loss between a pixel x of the input image and a pixel r of the synthesized image is defined as follows:

$$p_{pcep} = \sum_{i=1}^{N} \frac{1}{K_i} \left\| S^i(x) - S^i(r) \right\|_2^2,$$

where $S^i$ represents an i-th layer which includes $K_i$ elements and N training layers.

3. The method of segmenting the abnormal robust for the complex autonomous driving scenes according to claim 1, wherein in S4, firstly, predicted semantics in regions to be predicted are closely related to different abnormal scenes; secondly, the regions to be predicted are also closely related to uncertain pixels with high confidence, thereby guiding a network to perform an abnormal prediction based on uncertain information of pixels at the same time.

4. A system used for the method of segmenting the abnormal robust for the complex autonomous driving scenes according to claim 1, comprising:
the segmentation module, configured to transmit an obtained input image to the segmentation network to obtain segmentation prediction images, and then quantify the uncertainty of a segmentation prediction by means of calculating two different discrete metrics;
the synthesis module, configured to match a generated data distribution with a data distribution of the input image by utilizing a conditional generative adversarial network;
the difference module, configured to model and calculate the input image, an generated image, the semantic feature map and the uncertainty feature map based on an encoder, a fusion module and a decoder, to generate the segmentation prediction images for the abnormal objects;
the integrated prediction module, configured to take an obtained uncertainty prediction as a focus of the difference module, and predict input image data by utilizing a trained network model to obtain the segmentation prediction results of the abnormal objects.

5. A system used for the method of segmenting the abnormal robust for the complex autonomous driving scenes according to claim 2, comprising:
the segmentation module, configured to transmit an obtained input image to the segmentation network to obtain segmentation prediction images, and then quantify the uncertainty of a segmentation prediction by means of calculating two different discrete metrics;
the synthesis module, configured to match a generated data distribution with a data distribution of the input image by utilizing a conditional generative adversarial network;
the difference module, configured to model and calculate the input image, an generated image, the semantic feature map and the uncertainty feature map based on an encoder, a fusion module and a decoder, to generate the segmentation prediction images for the abnormal objects;
the integrated prediction module, configured to take an obtained uncertainty prediction as a focus of the difference module, and predict input image data by utilizing a trained network model to obtain the segmentation prediction results of the abnormal objects.

6. A system used for the method of segmenting the abnormal robust for the complex autonomous driving scenes according to claim 3, comprising:
the segmentation module, configured to transmit an obtained input image to the segmentation network to obtain segmentation prediction images, and then quantify the uncertainty of a segmentation prediction by means of calculating two different discrete metrics;
the synthesis module, configured to match a generated data distribution with a data distribution of the input image by utilizing a conditional generative adversarial network;
the difference module, configured to model and calculate the input image, an generated image, the semantic feature map and the uncertainty feature map based on an encoder, a fusion module and a decoder, to generate the segmentation prediction images for the abnormal objects;
the integrated prediction module, configured to take an obtained uncertainty prediction as a focus of the difference module, and predict input image data by utilizing a trained network model to obtain the segmentation prediction results of the abnormal objects.

* * * * *